United States Patent
Griessbach

(10) Patent No.: US 6,496,763 B2
(45) Date of Patent: Dec. 17, 2002

(54) SYSTEM FOR DETECTING VEHICLE ROLLOVERS

(75) Inventor: Robert Griessbach, Weyarn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 5 days.

(21) Appl. No.: 09/755,137

(22) Filed: Jan. 8, 2001

(65) Prior Publication Data

US 2001/0007962 A1 Jul. 12, 2001

(30) Foreign Application Priority Data

Jan. 8, 2000 (DE) .......................................... 100 00 550

(51) Int. Cl.$^7$ .............................................. B60R 21/32
(52) U.S. Cl. ........................ 701/45; 280/734; 280/735
(58) Field of Search ........................... 701/45; 280/734, 280/735, 801.1, 756

(56) References Cited

U.S. PATENT DOCUMENTS

| | | | |
|---|---|---|---|
| 5,835,873 A | * | 11/1998 | Darby et al. ................. 180/268 |
| 6,170,594 B1 | * | 1/2001 | Gilbert ........................ 180/282 |
| 6,212,455 B1 | * | 4/2001 | Weaver ....................... 180/282 |
| 6,282,474 B1 | * | 8/2001 | Chou et al. .................. 180/271 |
| 6,301,536 B1 | * | 10/2001 | Vaessen et al. ................ 701/45 |
| 6,315,074 B1 | * | 11/2001 | Achhammer et al. ........ 180/282 |

FOREIGN PATENT DOCUMENTS

| | | |
|---|---|---|
| DE | 37 37 554 A1 | 5/1989 |
| DE | 197 36 328 A1 | 2/1999 |

* cited by examiner

*Primary Examiner*—Michael J. Zanelli
(74) *Attorney, Agent, or Firm*—Crowell & Moring LLP

(57) ABSTRACT

In a system for detecting imminent or occurring rollovers in a vehicle having at least one rollover sensor for detecting a vehicle rollover and for emitting a corresponding signal, at least one rotational wheel speed sensor is provided which emits a signal corresponding to the respective rotational wheel speed to a control unit which is indirectly or directly connected with the at least one rollover sensor. The control unit is constructed such that a triggering signal can be generated for a safety system on the basis of the rollover signal, taking into account the at least one rotational wheel speed signal.

13 Claims, 1 Drawing Sheet

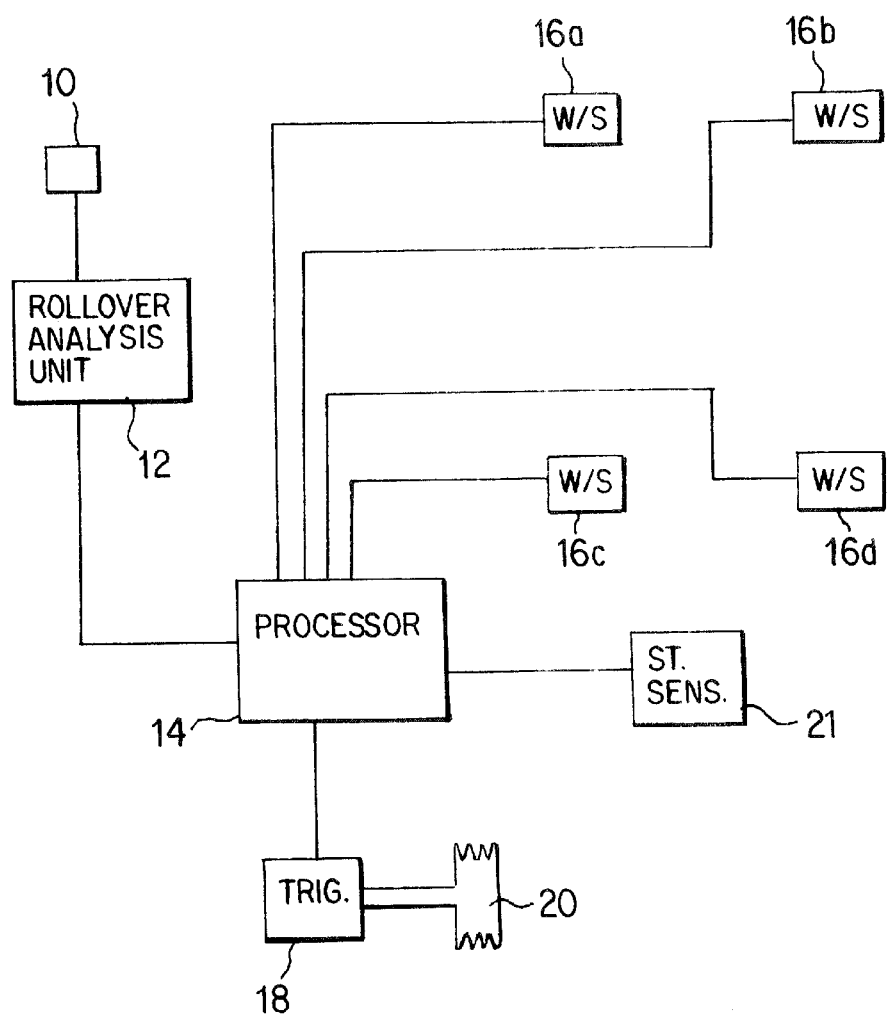

SYSTEM FOR DETECTING VEHICLE ROLLOVERS

BACKGROUND AND SUMMARY OF THE INVENTION

This application claims the priority of German patent document 100 00 550.0, filed Jan. 8, 2000, the disclosure of which is expressly incorporated by reference herein.

The invention relates to a system for detecting imminent or occurring vehicle rollovers.

Various methods and systems are known for detecting vehicle rollovers. Most known methods are based on the analysis of different sensors, which directly indicate the rollover, such as rotation rate and acceleration sensors. As a rule, these sensors are arranged in a common housing and are analyzed by a common microprocessor, which processes the detected measured values and emits information obtained therefrom concerning an imminent or occurring rollover to an air bag control unit. The latter, in turn, triggers the corresponding safety systems, such as side air bags, frontal air bags and head air bags or belt tightening devices.

The disadvantage of known systems is their susceptibility to errors in detecting and analysis; as a result, faulty triggering of safety equipment can occur, due to erroneous rollover information, because of a faulty sensor or a defectively operating control device. A faulty algorithm or a faulty data transmission between the rollover sensor system and the air bag triggering unit may lead to a faulty triggering. In this context, repair work on a vehicle while the safety system is active is also problematic. When a rollover sensor is removed from a vehicle, a rotating rate may, for example, be generated which leads to the triggering of the safety system.

One object of the invention is to provide a rollover detection system which reliably prevents faulty triggering of safety systems, for example, air bags.

This and other objects and advantages are achieved by the rollover detection system according to the present invention, in which information of rotational wheel speed sensors is also analyzed and used for examining the plausibility of a rollover signal. During a normal drive with a good road adherence, all four rotational wheel speeds are the same, or at least of the same order of magnitude. During cornering, slight differences occur which, however, can be corrected by way of steering angle information. During a beginning rollover, however, first two and, in the course of the rollover, all four wheels will lose contact with the ground. This information is utilized in the present invention. Because of the different points in time of the lifting-off of the wheels and of the different friction conditions of the powered and nonpowered wheels, rotational wheel speeds occur which cannot occur in the normal driving operation. As the result, this information can be utilized to evaluate the plausibility of the rollover signals, and faulty triggering of a safety system can be prevented.

According to various embodiments, it is possible to take into account different rollover sequences in stored algorithms. If a rollover, for example, precedes drastic brake application, when the wheels lift off the road surface, for example, an abrupt braking of the wheels can be observed. This information may also be utilized as additional information and can be processed in the algorithm.

According to a first embodiment of the invention, the signal of at least one rotational speed sensor is used to evaluate the rollover signal. The control unit generates a triggering signal for a safety system first on the basis of the rollover signal, and thereafter takes into account the rotational wheel speed signals and decides on the basis of this plausibility examination whether the safety device should be triggered.

According to a preferred embodiment, rotational wheel speed sensors are provided on all wheels, so that, by way of the analysis of still more information, the current stability condition of the vehicle can be analyzed more precisely.

Vehicle rotation rate and/or acceleration sensors, for example, can be used as rollover sensors, as is generally known.

As mentioned above, when several rotational speed sensors are used, it is advantageous to take into account the information of a steering angle sensor or of another sensor which supplies additional information with respect to cornering. The rotational speed differences occurring during a cornering can then be compensated.

order to detect a defective microprocessor as a fault source, it is also advantageous to provide for all rollover sensors or for each rollover sensor a separate analyzing unit for analyzing the respective rollover signal, and to then connect this analyzing unit with the control unit. As a result, the plausibility information is obtained in a separate component (specifically the control unit) which is independent of the rollover sensor system, and thus of the sensor itself, and of the analyzing unit. An error in the arithmetic-logic unit of the microprocessor itself can therefore be detected and does not lead to a faulty triggering.

Other objects, advantages and novel features of the present invention will become apparent from the following detailed description of the invention when considered in conjunction with the accompanying drawings.

BRIEF DESCRIPTION OF THE DRAWINGS

The single FIGURE is a schematic block diagram of a rollover detection system according to the present invention.

DETAILED DESCRIPTION OF THE DRAWINGS

In a conventional manner, a vehicle rotation rate sensor 10 is provided as a rollover sensor in a vehicle (not shown). This rotating rate sensor 10 is connected with a separate analyzing unit 12. During a vehicle rollover, the rotation rate sensor generates a corresponding rotation rate signal which is analyzed by the analyzing unit 12 and, when a specific value is exceeded, is reported to a control unit 14, with which the analyzing unit 12 is connected.

The control unit 14 is also connected with four rotational wheel speed sensors 16a, 16b, 16c and 16d, which emit their rotational wheel speed signals to the control unit 14.

In addition, the control unit 14 is connected with a steering angle sensor 21 which transmits the driving direction of the vehicle. From the information of the rotational wheel speed sensors 16a to 16b, the control unit 14 can determine, on the basis of a stored algorithm, whether a normal driving situation exists, for example, straight-ahead driving or cornering, or whether a critical driving situated, such as a swerving, exists, or whether the various rotational wheel speeds do not match. On the basis of the obtained additional information concerning the rotational wheel speed sensors 16a to 16d, the control unit 14 examines the information emitted by the analyzing unit 12 and determines whether there is a discrepancy. For example, a rollover would seem very improbable if all rotational wheel speed sensors indicate the same rotational wheel speeds and the steering angle sensor 21 signals a straight-ahead drive. It is to be assumed in this case that either the rotation rate sensor 10, the analyzing unit 12 or the transmission of the rotating rate information to the control unit 14 is faulty. In this case, triggering of a safety device is to be prevented. However, if the information from the rotational wheel speed sensors 16a to 16d, as the result of the presence of discrepancies between the rotational wheel speeds, should confirm the information of the analyzing unit 12, specifically that a vehicle rollover is taking place,—in the present case—an air bag triggering unit 18 is correspondingly acted upon, whereby an air bag 20 is triggered.

Naturally, other triggering devices of safety systems can also be activated in a corresponding manner, so that, for example, other air bags, belt tightening devices and comparable safety devices can be activated.

Since nowadays vehicles already have most hardware components, only a software modification will be required for implementing the present invention. For this reason, the present invention can contribute in a cost-effective manner to increasing the safety of a vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle rollover detection system, comprising:
    at least one rollover sensor for detecting an imminent or occurring vehicle rollover and for emitting a corresponding rollover signal for triggering a vehicle safety system;
    at least two rotational wheel speed sensors; each of which emits a signal corresponding to rotational speed of an associated wheel; and
    a control unit which is indirectly or directly connected with the at least one rollover sensor; wherein
        the control unit generates a triggering signal for a safety system based on the rollover signal, taking into account the at least two rotational wheel speed signals; and
        the control unit includes means for inferring existence of a normal driving operation based on wheel speed signals of the at least two wheel speed sensors, and for evaluating plausibility of the rollover signal based on said wheel speed signals.

2. The system according to claim 1, wherein rotational wheel speed sensors are provided on all vehicle wheels.

3. The system according to claim 1, wherein one of a vehicle rotation rate sensor and acceleration sensors are used as said at least one rollover sensor.

4. The system according to claim 1, further comprising a steering angle sensor by which different signals of different rotational wheel speed sensors which occur can be compensated.

5. The system according to claim 1, comprising:
    a plurality of rollover sensors; and
    a separate analyzing unit for analyzing a respective rollover signal for each rollover sensor; wherein the analyzing unit is connected with the control unit.

6. The system according to claim 1, wherein one of an air bag, a belt tightening device and a rollover bar can be activated as the safety system.

7. The system according to claim 1, further comprising:
    said control unit preventing triggering of said vehicle safety system in response to said rollover signal when said plausibility evaluation is negative.

8. A method for detecting a rollover of a vehicle, comprising:
    detecting conditions indicative of a rollover via a first rollover detection unit, and generating a rollover signal based thereon for triggering a vehicle safety system when a specified value is exceeded;
    measuring wheel speed of at least one wheel of said vehicle; and
    determining plausibility of said rollover signal based on analysis of said measured wheel speed.

9. A method for detecting vehicle rollover, comprising:
    detecting vehicle rotation by means of a rotation rate sensor;
    analyzing signals from said rotation rate sensor by means of an analysis unit, and generating a rollover signal for triggering a vehicle safety system when a specified value is exceeded;
    detecting wheel speeds of wheels of the vehicle;
    analyzing detected wheel speed information by means of a control unit, and determining plausibility of said rollover signal, based on said detected wheel speed information.

10. The method according to claim 9, further comprising:
    preventing triggering of a vehicle safety system in response to said rollover signal, when said plausibility determination is negative.

11. A vehicle rollover detection system comprising:
    at least one sensor for detecting parameters indicative of occurrence or absence of vehicle rollover;
    an analysis unit for analyzing detected parameters and determining existence of a vehicle rollover, based on preset criteria, and for generating a rollover signal indicative of occurrence of a vehicle rollover;
    a plurality of wheel speed sensors for detecting speeds of wheels of the vehicle;
    a control unit coupled to receive said rollover signal from said analysis unit, and to receive wheel speed information from said wheel speed sensors;
    wherein said control unit analyzes said wheel speed information and determines plausibility of a detected vehicle rollover indicated by said rollover signal, based on said wheel speed information.

12. The system according to claim 11, wherein said parameter indicative of vehicle rollover is a vehicle roll rate.

13. The system according to claim 11, wherein said control unit preventing triggering of a vehicle safety system in response to said rollover signal, when said plausibility determination is negative.

* * * * *